(12) United States Patent
Chen et al.

(10) Patent No.: US 9,666,944 B2
(45) Date of Patent: May 30, 2017

(54) ANTENNA FOR WIRELESS COMMUNICATION

(71) Applicant: UNIVERSAL SCIENTIFIC INDUSTRIAL (SHANGHAI) CO., LTD., Shanghai (CN)

(72) Inventors: Hsin-Hong Chen, Shanghai (CN); Cheng-Ta Li, Shanghai (CN); Jui-Chih Chien, Shanghai (CN); Jui-Kun Shih, Shanghai (CN)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 91 days.

(21) Appl. No.: 14/789,902

(22) Filed: Jul. 1, 2015

(65) Prior Publication Data

US 2016/0190695 A1    Jun. 30, 2016

(30) Foreign Application Priority Data

Dec. 26, 2014   (CN) .......................... 2014 1 0838516

(51) Int. Cl.

| | | |
|---|---|---|
| *H01Q 7/06* | (2006.01) | |
| *H01F 38/14* | (2006.01) | |
| *H01Q 1/52* | (2006.01) | |
| *H01F 27/36* | (2006.01) | |
| *G06K 19/077* | (2006.01) | |

(52) U.S. Cl.
CPC ............ *H01Q 7/06* (2013.01); *H01F 27/365* (2013.01); *H01F 38/14* (2013.01); *H01Q 1/526* (2013.01); *G06K 19/07777* (2013.01)

(58) Field of Classification Search
CPC ......... H01Q 1/526; H01Q 7/06; H01Q 1/2208

USPC .................................................. 343/787, 788
See application file for complete search history.

(56) References Cited

U.S. PATENT DOCUMENTS

| | | | | |
|---|---|---|---|---|
| 5,396,698 | A * | 3/1995 | Orthmann | ................. H01Q 7/06 29/600 |
| 6,509,879 | B2 * | 1/2003 | Cassel | .................... H01Q 1/243 343/700 MS |
| 8,268,092 | B2 * | 9/2012 | Yang | ................. G06K 19/07771 148/120 |

(Continued)

FOREIGN PATENT DOCUMENTS

| | | |
|---|---|---|
| TW | 200628062 | 1/2012 |
| TW | 201315021 | 4/2013 |
| WO | WO-2013/014958 A1 | 1/2013 |

OTHER PUBLICATIONS

Search Report received in Taiwan Application No. 103145857 issued Feb. 23, 2016, 2 pages with English translation.
US2007/0252771 is the English equivalent of TW200628062.

*Primary Examiner* — Tho G Phan
(74) *Attorney, Agent, or Firm* — Foley & Lardner LLP; Cliff Z. Liu

(57) ABSTRACT

The present disclosure relates to a wireless communication structure, including a plate, a first antenna, a first magnetic material layer, and a second magnetic material layer. The plate has a first surface, a second surface opposite to the first surface, and a lateral surface extending between the first surface and the second surface. The first antenna is located in the plate. The first magnetic material layer is adjacent to the lateral surface of the plate. The second magnetic material layer is located on the second surface of the plate.

18 Claims, 2 Drawing Sheets

(56) References Cited

U.S. PATENT DOCUMENTS

| | | |
|---|---|---|
| 8,902,123 B2 | 12/2014 | Dairiki et al. |
| 2006/0076405 A1* | 4/2006 | Takimoto ............. G06K 7/0008 235/382 |
| 2007/0252771 A1 | 11/2007 | Maezawa et al. |
| 2016/0268685 A1* | 9/2016 | Orihara ................... H01Q 7/06 |

* cited by examiner

US 9,666,944 B2

ANTENNA FOR WIRELESS COMMUNICATION

CROSS-REFERENCE TO RELATED PATENT APPLICATIONS

This application claims the benefit of and priority to Chinese Patent Application No. 201410838516.3, filed on 26 Dec. 2014, the content of which is incorporated herein by reference in its entirety.

BACKGROUND

1. Technical Field

The present disclosure relates to an antenna for wireless communication, and in particular, to an antenna for near field wireless communication.

2. Description of the Related Art

Near Field Communication (NFC) is a short-distance, high-frequency wireless communication technology and includes contact-free radio frequency identification (RFID) and interconnection technologies.

The NFC technology can be applied to products such as a credit card, an ID card, a smart phone, and a tablet computer, so as to provide services such as identity verification and transaction payment. It would be desirable to improve communication quality and increase communication distance of NFC.

SUMMARY

In accordance with an embodiment, a wireless communication structure includes a plate, a first antenna, a first magnetic material layer, and a second magnetic material layer. The plate has a first surface, a second surface opposite to the first surface, and a lateral surface extending between the first surface and the second surface. The first antenna is located in the plate. The first magnetic material layer is adjacent to the lateral surface of the plate. The second magnetic material layer is located on the second surface of the plate.

In accordance with an embodiment, a wireless communication structure includes a plate, a first antenna, and a magnetic material layer. The first antenna is located in the plate. The magnetic material layer is adjacent to the plate and covers a lateral surface of the plate.

In accordance with an embodiment, a wireless communication structure includes a plate, a first antenna, a second antenna, a first magnetic material layer, a second magnetic material layer, and a third magnetic material layer. The plate defines a hollow portion, and has an inner lateral surface, an outer lateral surface, and a lower surface substantially extending between the inner lateral surface and the outer lateral surface. The first antenna is located in the plate. The first magnetic material layer is adjacent to the outer lateral surface of the plate. The second magnetic material layer is located on the lower surface of the plate. The third magnetic material layer is adjacent to the inner lateral surface of the plate.

DETAILED DESCRIPTION

The present disclosure describes an antenna structure with improved reception and transmission capability, so as to improve communication quality and increase a communication distance of NFC.

In some embodiments of this disclosure, namely embodiments in which RFID is used for the NFC, an antenna structure is used for passive RFID, semi-passive RFID, or active RFID, each of which may benefit from improvements in communication quality and increased communication distance. Of these forms of RFID, in addition to challenges related to transmission through the antenna structure, passive RFID faces an additional challenge in that power to operate logic in a passive RFID device is received by way of an induced current from an associated antenna structure, and the received power should be sufficient to power the logic in the RFID device. Thus, in passive RFID devices, the antenna structure may be used both to receive a power transfer (the induced current) and to transmit information. Current may be induced in the antenna structure by passing the antenna through a magnetic field, such as a magnetic field generated by an RFID reader. The magnetic field is strongest closest to the source, and diminishes as a distance from the source increases. An improvement in the reception capability of the antenna structure may allow for an RFID device to receive sufficient power to operate the logic of the RFID device at an increased distance from a magnetic field source. Additionally, an improvement in the reception capability of the antenna may also improve the transmission capability of the antenna. Because of the additional challenges faced by passive RFID, this disclosure describes an antenna structure useful for improving a passive RFID device. However, one of ordinary skill in the art will understand that such an antenna structure will also be useful for improving other NFC devices, and indeed, non-NFC devices.

Figure 1A:
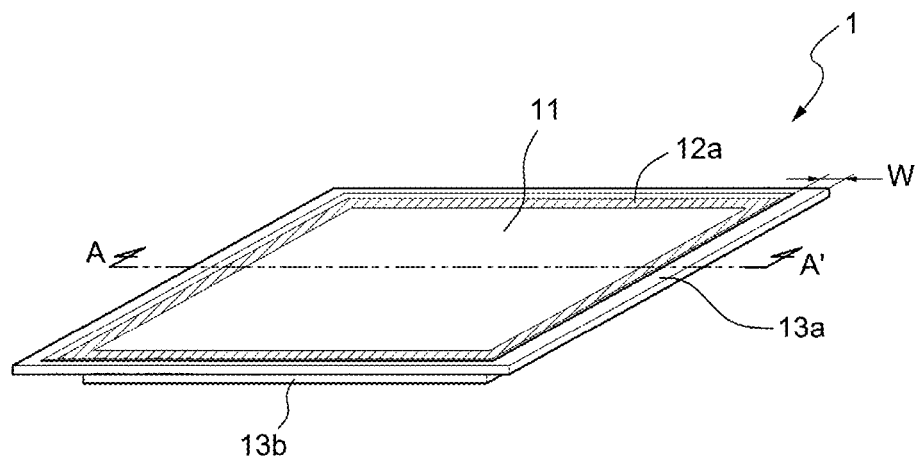
FIG. 1A illustrates a wireless communication structure according to an embodiment.

FIG. 1A discloses a wireless communication structure 1 (e.g., an antenna structure) according to an embodiment of the present disclosure. As shown in FIG. 1A, the wireless communication structure 1 includes a plate 11, a first antenna 12a, a first magnetic material layer 13a, and a second magnetic material layer 13b.

The plate 11 may be a circuit board, such as a printed circuit board, a flexible printed circuit board, or another suitable circuit board. The circuit board may be, but is not limited to, a single-sided board, a double-sided board, or a multilayer board.

The first antenna 12a is located on or partially or fully within the plate 11, at or near an upper surface of the plate 11. The first antenna 12a may be disposed at an edge of the plate 11. In one or more embodiments, the first antenna 12a extends beyond the plate 11, as shown in FIG. 1A; in other embodiments, the plate 11 covers the first antenna 12a (see, e.g., FIG. 1B). The first antenna 12a may be designed as a loop antenna, and is used to induce magnetic flux from a current (for transmission), or to induce current from magnetic flux (for reception). Magnetic fluxes induced by the first antenna 12a are mainly centralized in a loop of the first antenna 12a. Therefore, parameters such as a size, a material, or a number of windings of the first antenna 12a are designed according to magnetic fluxes to be induced. The material of the first antenna 12a may include a metal, a metal alloy, or other material(s) suitable for the desired magnetic flux induction.

The first magnetic material layer 13a is arranged around the plate 11. In one or more embodiments, the first magnetic material layer 13a may be in direct contact with a lateral surface of the plate 11. The first magnetic material layer 13a may surround a periphery of the plate 11, so that the first antenna 12a in the plate 11 is less susceptible to external electromagnetic interference (EMI), and thus a magnetic flux density is increased in the first antenna 12a. In one or more embodiments, the magnetic material in the first magnetic material layer 13a includes a ferrite material or an EMI absorber material.

A horizontal width W of the first magnetic material layer 13a may be adjusted to increase the magnetic flux density of the first antenna 12a in the plate 11, to further enhance protection against EMI. Moreover, an increase of the magnetic flux density may also increase an induction distance. In one or more embodiments, the horizontal width W may be no greater than or less than about 9 millimeters (mm), such as no greater than or less than about 8 mm, no greater than or less than about 7 mm, no greater than or less than about 6 mm, no greater than or less than about 5 mm, or no greater than or less than about 4 mm. In one or more embodiments, the horizontal width W may be about 1 mm to about 3 mm, such as about 1 mm to about 2 mm, or about 2 mm to about 3 mm, or about 2.9 mm to about 3.1 mm.

The second magnetic material layer 13b is located adjacent to a lower surface of the plate 11 and a lower surface of the first magnetic material layer 13a. In one or more embodiments, the second magnetic material layer 13b may be in direct contact with the lower surface of the plate 11, so that the first antenna 12a in the plate 11 is less susceptible to external EMI, and thus the induced magnetic flux density is increased, so as to improve reliability of a communication signal. In one or more embodiments, the second magnetic material layer 13b includes a ferrite material or an EMI absorber material.

Figure 1B:
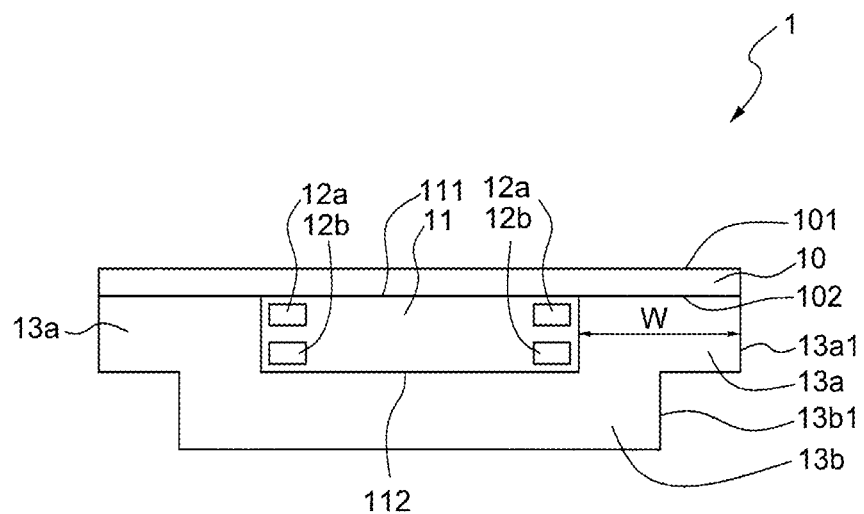
FIG. 1B is a sectional view of the wireless communication structure shown in FIG. 1A.

FIG. 1B is a sectional view along a line segment A-A' in FIG. 1A. In addition to a sectional view of the wireless communication structure 1 in FIG. 1A, FIG. 1B shows a connection layer 10 that may be further included, and a second antenna 12b (not shown in FIG. 1A) located below the first antenna 12a. In the embodiment illustrated in FIG. 1B, both of the first antenna 12a and the second antenna 12b are within the plate 11.

The connection layer 10 has a first surface 101 and a second surface 102 opposite to the first surface 101. In one or more embodiments, the connection layer 10 may be, or may include, an adhesive material. An upper surface 111 of the plate 11 may be attached to the second surface 102 of the connection layer 10. The first magnetic material layer 13a may be attached to the second surface 102 of the connection layer 10. In one or more embodiments, the first surface 101 of the connection layer 10 may be attached to another component or device (not shown).

The second antenna 12b is located in the plate 11. The second antenna 12b is disposed at an edge of the plate 11 and adjacent to a lower surface 112 of the plate 11. The second antenna 12b may be designed as a loop antenna, and is used to induce magnetic flux from a current (for transmission), or to induce current from magnetic flux (for reception). Magnetic fluxes induced by the second antenna 12b are mainly centralized in a loop of the second antenna 12b. Therefore, parameters such as a size, a material, or a number of windings of the second antenna 12b are designed according to magnetic fluxes to be induced. The material of the second antenna 12b may include a metal, a metal alloy, or other material(s) suitable for the desired magnetic flux induction.

In one or more embodiments, a lateral surface 13a1 of the first magnetic material layer 13a is not coplanar with a lateral surface 13b1 of the second magnetic material layer 13b. In other words, the lateral surface 13a1 is offset from the lateral surface 13b1. For example, the lateral surface 13a1 of the first magnetic material layer 13a protrudes or extends horizontally beyond the lateral surface 13b1 of the second magnetic material layer 13b, as shown in FIG. 1B. For another example, the lateral surface 13a1 of the first magnetic material layer 13a is recessed from the lateral surface 13b1 of the second magnetic material layer 13b. In one or more embodiments, the lateral surface 13a1 of the first magnetic material layer 13a may be substantially coplanar with the lateral surface 13b1 of the second magnetic material layer 13b. In other words, the lateral surface 13a1 of the first magnetic material layer 13a may be substantially aligned with the lateral surface 13b1 of the second magnetic material layer 13b.

The first magnetic material layer 13a and the second magnetic material layer 13b may be formed integrally. Together, the first magnetic material layer 13a and the second magnetic material layer 13b form a concave structure, which accommodates and surrounds the plate 11. In one or more embodiments, the first magnetic material layer 13a and the second magnetic material layer 13b may be two separate magnetic material layers. In another embodiment, the first magnetic material layer 13a and the second magnetic material layer 13b are made of a same material. In one or more embodiments, the first magnetic material layer 13a and the second magnetic material layer 13b are made of different materials.

Figure 2A:
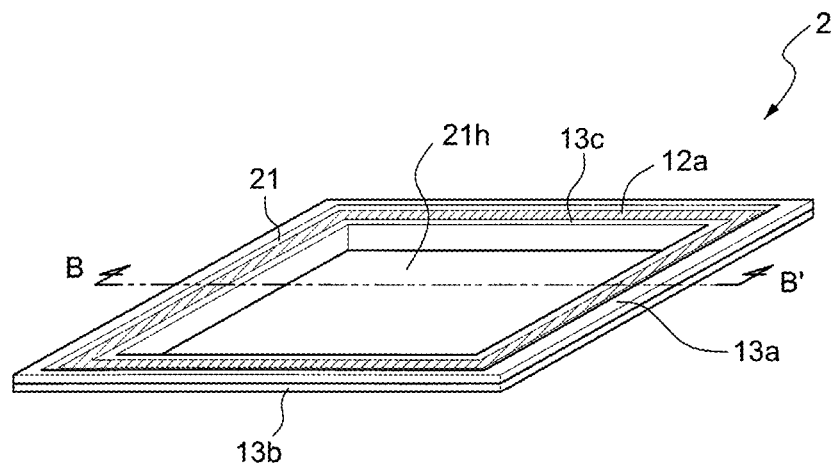
FIG. 2A illustrates a wireless communication structure according to another embodiment.

FIG. 2A discloses a wireless communication structure 2 according to an embodiment of the present disclosure. The wireless communication structure 2 in FIG. 2A is similar to the wireless communication structure 1 in FIG. 1A, and a difference lies in that the plate 21 defines a hollow portion 21h. As illustrated in FIG. 2A, the hollow portion 21h has approximately a square shape; however, in other embodiments, the hollow portion 21h may have another polygonal or non-polygonal shape, or a circular or elliptical shape. The first magnetic material layer 13a and the second magnetic material layer 13b in FIG. 1B may be adjusted (as compared to FIG. 1A) to the shape of the plate 21. For example, the second magnetic material layer 13b may also define a hollow portion, which may be the same size and shape as the hollow portion 21h of the plate 21, or may be a different size or a different shape.

In one or more embodiments, the first magnetic material layer 13a is arranged on an outer lateral surface of the plate 21 and surrounds the outer lateral surface of the plate 21. In one or more embodiments, the first magnetic material layer 13a may be in direct contact with the outer lateral surface of the plate 21.

In one or more embodiments, a third magnetic material layer 13c is arranged on an inner lateral surface of the plate 21. In one or more embodiments, the third magnetic material layer 13c may be in direct contact with the inner lateral surface of the plate 21.

In one or more embodiments, a second magnetic material layer 13b is located adjacent to a lower surface 212 of the plate 21. In one or more embodiments, the second magnetic material layer 13b may be in direct contact with the lower surface 212 of the plate 21.

The first magnetic material layer 13a, the second magnetic material layer 13b, and the third magnetic material layer 13c together surround and accommodate the plate 21, so that a first antenna 12a in the plate 21 is less susceptible to external EMI. In one or more embodiments, a magnetic material in one or more of the first magnetic material layer 13a, the second magnetic material layer 13b, and the third magnetic material layer 13c includes a ferrite material or an EMI absorber material.

Figure 2B:
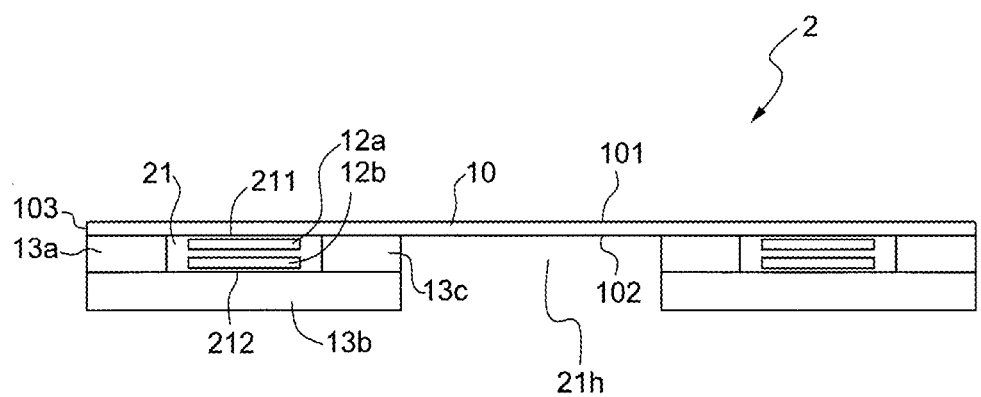
FIG. 2B is a sectional view of the wireless communication structure shown in FIG. 2A.

In addition to a sectional view of the wireless communication structure 2 in FIG. 2A, FIG. 2B shows a connection layer 10 that may be further included in the wireless communication structure 2, and a second antenna 12b (not shown in FIG. 2A) located below the first antenna 12a.

The connection layer 10 has a first surface 101 and a second surface 102 opposite to the first surface 101. In one or more embodiments, the connection layer 10 may be, or may include, an adhesive material. The plate 21 may be attached to the second surface 102 of the connection layer 10. The first magnetic material layer 13a and the third magnetic material layer 13c may be attached to the second surface 102 of the connection layer 10. In one or more embodiments, the first surface 101 of the connection layer 10 may be attached to another component or device (not shown).

The second antenna 12b is located in the plate 21. The second antenna 12b is adjacent to a lower surface 212 of the plate 21.

and the third magnetic material layer 13c form a concave structure, which accommodates and surrounds the plate 21.

There may be a predetermined threshold related to current induced in the antenna structure, above which a communication chip in an NFC device is able to, or is allowed to, transmit. For example, the predetermined threshold may be a function of the logic levels of communication circuitry, or minimum drive current levels of a transmission circuit, or may be a threshold set in software. Current induced in the antenna may vary with the design of the antenna, and varies with induction distance. A longer induction distance induces a smaller current. Conversely, a larger induction current provides for a greater transmission distance. Thus, for a receiving wireless communication structure 1 or 2, the farther away the induction source is, the smaller the induced current; and for a transmitting wireless communication structure 1 or 2, the greater the induction current is, the greater the transmission distance can be.

Table 1 provides measurement results of induction currents obtained according to different designs of the wireless communication structure 1 in FIGS. 1A and 1B. Specifically, Table 1 lists several horizontal widths W of first magnetic material layers 13a with associated measured induction currents of the first antenna 12a and the second antenna 12b. The horizontal width W of the first magnetic material layer 13a is given in mm. The induction current is given in milliamps (mA). Each measurement was taken with the wireless communication structure 1 at a same distance from a magnetic field source.

TABLE 1

| W (mm) | 0 | 1 | 2 | 3 | 4 | 5 | 6 | 7 | 8 | 9 |
|---|---|---|---|---|---|---|---|---|---|---|
| Induction current (mA) | 7.62 | 8.07 | 8.09 | 8.18 | 8.15 | 8.16 | 8.21 | 8.24 | 8.32 | 8.29 |

In one or more embodiments, a lateral surface of the first magnetic material layer 13a is substantially coplanar with a lateral surface of the second magnetic material layer 13b, and a lateral surface of the third magnetic material layer 13c is substantially coplanar with a lateral surface of the second magnetic material layer 13b, as illustrated in the embodiment of FIG. 2B. In one or more embodiments, the lateral surface of the first magnetic material layer 13a and the lateral surface of the third magnetic material layer 13c are not coplanar with a lateral surface of the second magnetic material layer 13b. In other words, the lateral surfaces of the first magnetic material layer 13a and the third magnetic material layer 13c protrude or extend horizontally beyond the lateral surface of the second magnetic material layer 13b, or are recessed from the lateral surface of the second magnetic material layer 13b.

In one or more embodiments, the first magnetic material layer 13a, the third magnetic material layer 13c, and the second magnetic material layer 13b may be separate or discrete magnetic material layers. In one or more embodiments, the first magnetic material layer 13a, the second magnetic material layer 13b, and the third magnetic material layer 13c are made of a same material. In one or more embodiments, the first magnetic material layer 13a, the second magnetic material layer 13b, and the third magnetic material layer 13c are made of different materials. In one or more embodiments, the first magnetic material layer 13a, the second magnetic material layer 13b, and the third magnetic material layer 13c are formed integrally. The first magnetic material layer 13a, the second magnetic material layer 13b, As shown in Table 1 for the tested samples at the tested distance, the induction current of the first antenna 12a and the second antenna 12b generally increased from about 7.62 mA to about 8.29 mA as the width W of the first magnetic material layer 13a increased from zero (no magnetic material layer 13a) to about 9 mm. From these results, it can be determined that surrounding a plate (e.g., plate 11) with a magnetic material can increase an induction current of an antenna (e.g., 12a, 12b) in the plate.

Consider that 7.62 mA is a threshold to drive an associated communication chip. To achieve this current using the wireless communication structure 1 designs represented by Table 1, a maximum induction distance is about 0.7 cm for the case where the plate 11 is not surrounded by the first magnetic material layer 13a (the column in Table 1 where W=0). As shown in Table 1, when the first magnetic material layer 13a with a width W=1 mm is added to surround the plate 11, a measured induction current increases to 8.07 mA. Under this condition, the maximum induction distance that allows for sufficient induced current to drive the communication chip increases to 1.7 cm, that is, the distance is increased by a factor of 1.4. Thus, as compared with an antenna structure in which a plate is not covered by a magnetic material, the wireless communication structure 1 shown in FIG. 1A and FIG. 1B may provide for greater induction current and induction distance.

Therefore, according to the present disclosure, an induction current of an antenna can be increased, so as to increase a communication distance of NFC and improve communication quality. In this way, a probability of induction failures or data transmission errors can be reduced.

As used herein and not otherwise defined, the terms "about" and "substantially" are used to describe and account for small variations. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 µm, no greater than 2 µm, no greater than 1 µm, or no greater than 0.5 µm.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A wireless communication structure, comprising:
   a plate, having a first surface, a second surface opposite to the first surface, and a lateral surface extending between the first surface and the second surface;
   a first antenna, located in the plate;
   a first magnetic material layer, adjacent to the lateral surface of the plate;
   a second magnetic material layer, located on the second surface of the plate; and
   a connection layer, wherein the first surface of the plate and the first magnetic material layer are attached to a surface of the connection layer.

2. The wireless communication structure according to claim 1, wherein a lateral surface of the second magnetic material layer is offset from a lateral surface of the first magnetic material layer.

3. The wireless communication structure according to claim 2, wherein the first magnetic material layer and the second magnetic material layer are formed integrally.

4. The wireless communication structure according to claim 1, wherein a lateral surface of the second magnetic material layer is substantially coplanar with a lateral surface of the first magnetic material layer.

5. The wireless communication structure according to claim 1, further comprising a second antenna, located in the plate.

6. The wireless communication structure according to claim 5, wherein the first antenna is adjacent to the first surface of the plate, and the second antenna is adjacent to the second surface of the plate.

7. The wireless communication structure according to claim 6, wherein the first antenna and the second antenna are disposed adjacent to an edge of the plate.

8. The wireless communication structure according to claim 1, wherein the connection layer comprises an adhesive material.

9. The wireless communication structure according to claim 1, wherein the first magnetic material layer and the second magnetic material layer comprise a ferrite material or an electromagnetic interference (EMI) absorber material.

10. The wireless communication structure according to claim 1, wherein a horizontal width of the first magnetic material layer is less than 3 millimeters.

11. A wireless communication structure, comprising:
    a plate, having a first surface;
    a first antenna, located in the plate;
    a magnetic material layer, adjacent to the plate and surrounding a lateral surface of the plate; and
    a connection layer, wherein the first surface of the plate and a portion of the magnetic material layer are attached to a surface of the connection layer.

12. The wireless communication structure according to claim 11, further comprising a second antenna, located in the plate.

13. The wireless communication structure according to claim 12, wherein the first antenna is adjacent to the first surface of the plate, and the second antenna is adjacent to a second surface of the plate, opposite to the first surface of the plate.

14. The wireless communication structure according to claim 11, wherein the magnetic material layer is provided with a concave structure, and the plate is located in the concave structure.

15. The wireless communication structure according to claim 11, wherein the connection layer is made of an adhesive material.

16. The wireless communication structure according to claim 11, wherein the magnetic material is a ferrite material or an EMI absorber material.

17. A wireless communication structure, comprising:
    a plate defining a hollow portion, the plate having an inner lateral surface, an outer lateral surface, and a lower surface substantially extending between the inner lateral surface and the outer lateral surface;
    a first antenna, located in the plate;
    a first magnetic material layer, adjacent to the outer lateral surface of the plate;
    a second magnetic material layer, located on the lower surface of the plate; and
    a third magnetic material layer, adjacent to the inner lateral surface of the plate.

18. The wireless communication structure according to claim 17, wherein the second magnetic material layer is adjacent to lower surfaces of the first magnetic material layer and the third magnetic material layer.

\* \* \* \* \*